US008054380B2

United States Patent
Bruna et al.

(10) Patent No.: US 8,054,380 B2
(45) Date of Patent: Nov. 8, 2011

(54) METHOD AND APPARATUS FOR ROBUST SUPER-RESOLUTION VIDEO SCALING

(75) Inventors: Joan Bruna, Paris (FR); Stephane Mallat, Paris (FR)

(73) Assignee: Zoran (France), Malakoff (FR)

( * ) Notice: Subject to any disclaimer, the term of this patent is extended or adjusted under 35 U.S.C. 154(b) by 595 days.

(21) Appl. No.: 12/296,845

(22) PCT Filed: Apr. 12, 2006

(86) PCT No.: PCT/EP2006/004316
§ 371 (c)(1),
(2), (4) Date: Dec. 16, 2008

(87) PCT Pub. No.: WO2007/115583
PCT Pub. Date: Oct. 18, 2007

(65) Prior Publication Data
US 2009/0278981 A1    Nov. 12, 2009

(51) Int. Cl.
H04N 7/01     (2006.01)
H04N 9/74     (2006.01)
H04N 11/20    (2006.01)
H04N 5/14     (2006.01)
G09G 5/00     (2006.01)
G06K 9/32     (2006.01)

(52) U.S. Cl. ........ 348/448; 348/458; 348/581; 348/452; 348/700; 348/701; 345/660; 382/298

(58) Field of Classification Search .................. 348/441, 348/448, 458, 581, 669–701; 345/660; 382/298
See application file for complete search history.

(56) References Cited

U.S. PATENT DOCUMENTS

| | | | |
|---|---|---|---|
| 5,428,398 A | 6/1995 | Faroudja et al. | |
| 5,661,525 A * | 8/1997 | Kovacevic et al. | 348/452 |
| 5,936,676 A * | 8/1999 | Ledinh et al. | 348/452 |
| 6,181,382 B1 * | 1/2001 | Kieu et al. | 348/459 |
| 6,577,345 B1 * | 6/2003 | Lim et al. | 348/452 |
| 6,614,489 B1 | 9/2003 | McIntyre et al. | |
| 6,940,557 B2 | 9/2005 | Handjojo et al. | |
| 7,190,406 B2 * | 3/2007 | Ji et al. | 348/448 |
| 7,567,294 B2 * | 7/2009 | Lu et al. | 348/452 |

(Continued)

OTHER PUBLICATIONS

Schultz Richard R. et al., "Improved Definition Video Frame Enhancement", Acoustics, Speech and Signal Processing, 1995, ICASSP-95, 1995 International Conference on Detroit, MI, USA, May 9-12, 1995, pp. 2169-2172.

(Continued)

Primary Examiner — Brian Yenke
(74) Attorney, Agent, or Firm — Lando & Anastasi, LLP (57) ABSTRACT

A method and apparatus for scaling video images, which applies more particularly to techniques for converting video sequence formats and deinterlacing. The invention comprises a parameterized interpolation (101) which computes interpolations at each new point of the output. An insensitive interval estimation (102) computes an interval where the probability distribution of the output image value is estimated to have its maximum, and an insensitive loss calculation (103) derives for each interpolation value a negative log likelihood measurement from an interval-insensitive probability distribution. After a spatial regularization (104) the invention includes a minimum loss selection (105) which selects the minimum loss interpolation at each new point and provides it as an output image value. The invention also includes a total variation increment module and a directional matching error module that can penalize the insensitive loss, for the minimum loss selection.

17 Claims, 5 Drawing Sheets

U.S. PATENT DOCUMENTS 7,613,364 B2 * 11/2009 Kang et al. .............. 382/300
7,982,799 B2 * 7/2011 Niedermeier ............. 348/448

OTHER PUBLICATIONS

Atkins Brian C., "Classification-Based Methods in Optimal Image Interpolation", Doctoral Thesis, Faculty of Purdue University, Dec. 1998, pp. 1-95, and more specifically "2.2 Efficient Resolution Synthesis", pp. 21-27.

Capel David et al., "Super-Resolution Enhancement of Text Image Sequences", Pattern Recognition, 2000 Proceedings 15th International Conference on Sep. 3-7, 2000, Los Alamitos, CA, USA, IEEE Computer Science, Sep. 3, 2000, vol. 1, pp. 600-605.

Bouman Charles, "A Generalized Gaussian Image Model for Edge-Preserving Map Estimation", IEEE Transactions on Image Processing, vol. 2, No. 3, Jul. 1993, pp. 296-310.

Vapnik V N, "The Support Vector Method for Estimating Real-Valued Functions", Statistical Learning Theory, John Wiley and Sons, pp. 443-456.

Chu Wei et al., "Bayesian Support Vector Regression Using a Unified Loss Function", IEEE Transactions on Neutral Networks, vol. 15, No. 1, Jan. 2004, pp. 29-44, Sections II, III and IV.

* cited by examiner

METHOD AND APPARATUS FOR ROBUST SUPER-RESOLUTION VIDEO SCALING

CROSS-REFERENCE TO RELATED APPLICATION

This application is the National Stage of International Application No. PCT/EP2006/004316, filed on Apr. 12, 2006. The contents of which are hereby incorporated by reference in their entirety.

BACKGROUND OF INVENTION

The present invention relates generally to the processing of video images and more particularly to techniques for converting video sequence formats with scaling. The multiplicity of video formats requires to adapt the format of an incoming video to the format required by a display device or for transmission. In an interlaced video, each successive image, also called field, provide alternatively in time even and odd lines. Simple Definition television (SDTV) such as NTSC, PAL and SECAM television format, are interlaced. An interlaced monitor such as a cathode ray tube (CRT) is designed to display these fields, with an interlaced scanning of even and odd lines. Progressive video image formats incorporate all lines (even and odd) in each image. LCD video monitors are designed to display progressive videos. For an input interlaced video it is thus necessary to perform a deinterlacing that compute respectively the missing odd and even lines in each field of the interlaced video sequence, to output a progressive video. Several High Definition Television formats have also been adopted, with a progressive format 720 p of 720 lines or an interlaced format 1080 i of 1080 lines. Converting an SDTV video format to an HDTV video format typically requires to perform a deinterlacing and change the number of lines from say 486 for NTSC to 720 for 720 p HDTV.

Deinterlacing and changing the number of lines of a video sequences is a scaling operation that converts an input video defined on an interlaced sampling grid to an output video defined on a output sampling grid. A deinterlacing is a scaling where the output sampling grid include both even and odd lines. A further modification of the number of lines further modifies the output sampling grid. Scaling videos requires to compute pixel values on a prescribed output sampling grid from the pixel values of the input video defined on a different input sampling grid.

A first approach is to compute each output video image at a time t from the input video image at t using an FIR filtering to perform a spatial interpolation that computes samples on the output grid from the input sample values. When the input image is interlaced, it is sampled much below the Shannon sampling rate, and interpolations thus produce artifacts that are highly visible in the resulting video. Directional interpolations can partly reduce these artifacts but not completely because the information necessary to perform the interpolation is not available. If the input image is progressive, increasing the sampling density also produce a blurred image. U.S. Pat. No. 6,614,489 provides an example of this approach.

A second approach called "motion adaptive" performs a time interpolation if no motion is locally detected in the image or a spatial interpolation if a significant motion is detected. In presence of significant motion, these techniques implement a spatial interpolations and thus produce the same type of artifacts as spatial interpolation techniques. U.S. Pat. No. 5,428,398 provides an example of this approach.

A third approach called "motion compensated," measures the displacement in the image and perform an interpolation in time that takes into account the measure motion. By combining the information of several images in time, such techniques can improve the spatial resolution of the image after scaling and restore finer details. This is called a super-resolution processing. Yet, existing motion compensated techniques are unstable and introduce visible artifacts. Indeed, computing precisely the displacement of image pixels is difficult, specially with interlaced images that are undersampled. Motion discontinuities at occlusions or fine scale motions such as produced by dust, or motion transparencies produce motion estimation errors that yield artifacts when using these motion vectors for time interpolation. To reduce these artifacts, motion compensated scaling procedures perform a spatial interpolation when the confidence in the measured motion is not sufficient. The reduction of motion artifacts is then performed at the cost of introducing artifacts introduced by the spatial scaling. U.S. Pat. No. 6,940,557 provides an example of this approach.

None of the state of the art procedures for video scaling fully takes fully advantage of the space-time information provided by an input-video sequence in order to perform a super-resolution scaling of high quality. Therefore, it is an object of the present invention to obviate or mitigate at least some of the above-mentioned disadvantages to convert video sequences with a scaling procedure.

SUMMARY OF THE INVENTION

It is a primary object of this invention to devise a method and means to perform a robust super-resolution scaling of an input video, that may include a deinterlacing.

The method according to the invention processes a video signal with input images defined on a spatio-temporal input grid. It outputs a video on a predefined spatio-temporal output grid. Calculations are performed on a spatio-temporal new grid of new points that are points of the output grid that are not in the input grid.

The invention applies a predefined family of parameterized interpolators which are linear operators that implement a parameterized weighted averaging of the input video values in spatio temporal neighborhoods of each new point of the new grid, to output a parameterized interpolation at each new point. As opposed to motion adaptive or motion compensated techniques that estimate the motion and make a decision between spatial or time interpolation along the estimated motion to compute an interpolation, no motion estimation is required in this invention and errors commonly generated by such motion estimation are thus alleviated. Instead of estimating a motion to optimize an interpolation, a whole family of possible interpolators are computed and a best interpolator is selected with a robust maximum likelihood technique, which minimizes a loss defined from a negative log-likelihood.

At each new point, the method estimates a conditional probability distribution of the new point value given the input video values in a spatio-temporal neighborhood. Because of the limited amount of data available in such a neighborhood and the large variability of the video values, an interval insensitive probability distribution is used to obtain robust results. For each new point, an interval is estimated from input image values in a spatio-temporal neighborhood of this new point, such that the probability density of the output image value at this new point is estimated to have its maximum within this interval of values.

For each new point, the invention computes for each parameterized interpolation an insensitive loss value based on an second probability distribution, which is constant and maximum within the interval of values associated with said new point. The second probability distribution is also referred to herein as "interval-insensitive". This insensitive loss can be representative of a negative log-likelihood of said interpolated value relatively to the interval-insensitive probability distribution defined from the interval of values associated with said new point.

For each parameterized interpolator, the insensitive loss is filtered spatially in order to be regularized with a weighted sum in a spatial neighborhood of each new point and this regularized loss is provided in input of a minimum loss selection process.

For each new point of said new grid, the invention selects a best parameterized interpolation which minimizes the regularized loss among all parameterized interpolations at this new point. It then outputs a video whose value at each output point of the output grid is either equal to the input video value if this output point is in the input grid or is equal to the best parameterized interpolation at this output point if this output point is a new point.

In this invention, for each new point the insensitive interval can be estimated with a robust process that divides the spatio-temporal neighborhood of the new point into a plurality of sub-neighborhoods. For each sub-neighborhood a partial insensitive interval is estimated from two values of specified rank obtained by sorting input image values in this sub-neighborhood, and a single insensitive interval is obtained by combining this plurality of partial insensitive intervals.

In this invention, the interval-insensitive probability distribution can be the Vapnik interval insensitive probability distribution that has an exponential decay outside the insensitive interval.

The method according to the invention can further comprise a penalization of the insensitive loss by a total variation increment. This penalization provides a control over the oscillations introduced by the selected best interpolation. For each parameterized interpolator and for each new point the method can include the computation of a total variation increment resulting from an aggregation of input image values and interpolated values calculated by the parameterized interpolator, in a one-dimensional neighborhood of the new point. This one-dimensional neighborhood can be chosen to be horizontal or vertical. For each parameterized interpolator this total variation increment is filtered spatially with a weighted sum in a spatial neighborhood of each new point and this regularized total variation increment is provided in input of the minimum loss selection process. For each new point, the regularized insensitive loss can be penalized by the regularized total variation increment at said new point so that the selected best parameterized directional interpolation minimizes this penalized regularized insensitive loss among all parameterized interpolations at the new point.

In this invention, the parameterized interpolators can be parameterized directional interpolators that compute linear interpolations along parameterized spatio-temporal directions of the input grid.

The method according to the invention can further comprise a penalization of the insensitive loss by a directional matching error. For directional penalized interpolators, this penalization ensures that input image values have little variations in the spatio-temporal direction of the selected best interpolation. For each parameterized directional interpolator along a parameterized spatio-temporal direction and for each new point, a directional matching error is computed from the difference of interpolated input video values aligned with the new point along the spatio-temporal direction. For each parameterized directional interpolator, the directional matching error is filtered with a weighted sum in a spatial neighborhood of each new point and this regularized matching error is provided in input of the minimum loss selection process. For each new point the regularized insensitive loss is penalized by the regularized matching error to select a best parameterized directional interpolation which minimizes this penalized regularized insensitive loss among all parameterized interpolations at this new point. For each new point the regularized insensitive loss can also be penalized both by the regularized total variation increment and by the regularized matching error at this new point, to select a best parameterized directional interpolation.

The method of the present invention applies in particular to input video which are interlaced in order to output a video that is progressive. For such a deinterlacing, the method according to the invention can further comprise a classification of the input image into "Telecined Film Type", or "Interlaced Video Type" and which specifies if the input image is mostly similar to the "Previous" input image or to the "Next" input image. It then modifies the selection of the best parameterized directional interpolation at each new point, which either minimizes the penalized regularized insensitive loss at this new point or which is a copy from the "Next" or "Previous" image value at this new point location, depending upon the image class.

Another aspect of the invention relates to a digital video scaling method for processing an input video signal having respective input image values at points of a space-time input grid to deliver an output video signal having respective output image values at points of a space-time output grid including points of said input grid and new points. The method comprises the following steps for each of these new points. Applying a predefined family of parameterized linear interpolators to the input images values in a respective space-time neighborhood of the new point to provide an interpolated value at the new point for each interpolator of the family. For each interpolator of the family, computing a total variation increment resulting from an aggregation of input image values and interpolated values calculated with the interpolator in a one-dimensional spatial neighborhood of the new point. For each interpolator of the family, filtering spatially the total variation increment in a spatial neighborhood of the new point. Selecting an interpolator of the family which fulfills a minimization criterion depending on the filtered total variation increment, wherein the interpolated value for the selected interpolator is taken as the output image value at the new point. Such minimization criterion typically combines the filtered total variation increment with another cost or loss value which advantageously consists of the filtered loss value derived from the interval-insensitive probability distribution as described hereabove. However, other cost or loss functions can also be used in alternative embodiments of the invention.

The invention also includes a television system for displaying images on a television display comprising means for receiving an input video signal, means for processing the input video signal in accordance with a method as disclosed above, and means for displaying an output video signal produced by the processing means.

The invention also includes a video scaling apparatus, comprising computer means arranged to carry out a method as disclosed above.

The invention also includes a computer program product, comprising instructions to carry out a method as disclosed above, when the program is run in a computer processing unit.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

Figure 1:
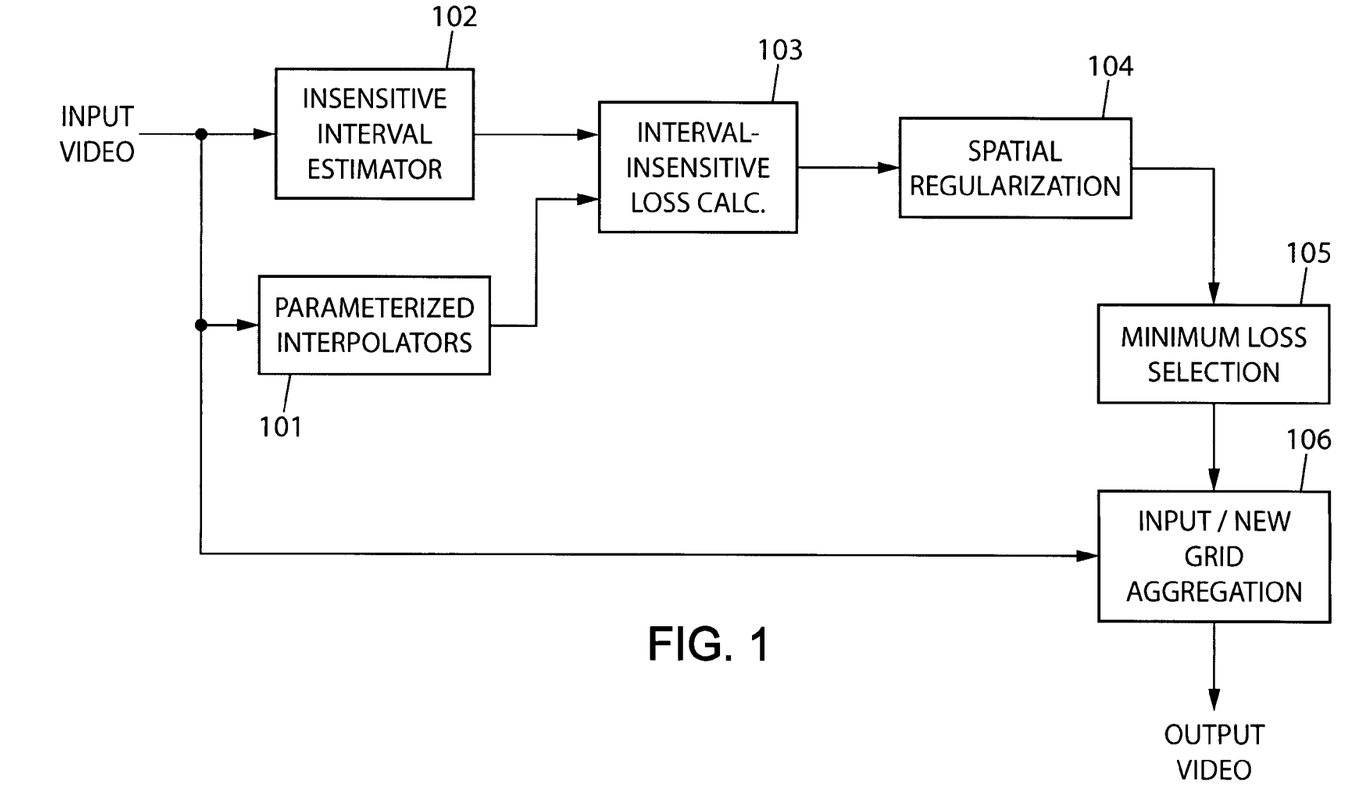
FIG. 1 shows, in block diagram form, an exemplary embodiment of the invention which takes in input a video and computes an output video on a predefined output grid by minimizing an interval insensitive loss.

FIG. 1 shows a first apparatus exemplifying the present invention. The apparatus processes a video signal of 2D images defined on a spatio-temporal input grid G. For each time index t, where t is an integer parameter, the spatio-temporal input-grid G is a grid of points whose coordinates in $R^3$ are $x(n_1, n_2, t) = n_1 \tau_1 + \alpha n_2 \tau_2 + \tau_3 + \tau_4(t)$ where $\tau_1 = (1, 0, 0)$ and $\tau_2 = (0, 1, 0)$ are normalized horizontal and vertical spatial vectors, $\tau_3 = (0, 0, 1)$ is a vector along time, and $\tau_4(t)$ is a spatial shift that depends if the video is interlaced or progressive. If the input video is interlaced then it is composed of two fields at two time instant t and t+1, where for t even the first one includes the even rows and the second one the odd row. In this case the input grid are defined in $R^3$ by $\alpha=2$ and $\tau_4(t)=(0, 0, 0)$ if t is even and $\tau_4(t)=(0, 1, 0)$ if t is odd. If the input video is progressive then $\alpha=1$ and $\tau_4(t)=(0, 0, 0)$ for all t. To each input grid point $x(n_1, n_2, t)$ the input video gives an image value $v(n_1, n_2, t)$. For example, for the PAL standard, the integers $n_1$, $n_2$ are respectively in the range from 1 to 720 and from 1 to 288, $\alpha$ is equal to 2 and the time increment corresponding to one unit of t is 20 ms.

The image value is typically a multicomponent value. For example, in the YCbCr colorspace, each grid point has a Y component that specifies the luminance and two chroma component Cb and Cr that together specify the color. The processing is described herein on a single component and thus the image value $v(n_1, n_2, t)$ is used to specify any single component value. However, several alternatives that process simultaneously all the components are possible and are described further below.

The super-resolution system of FIG. 1 outputs a video stream of 2D images defined on a spatio-temporal output grid $\hat{G}$. At each time instant t, the output-grid $\hat{G}$ is a uniform spatial grid of points $\hat{x}(n_1, n_2, t) = \alpha_1 n_1 \tau_1 + \alpha_2 \alpha n_2 \tau_2 + t\tau_3 + \tau_5(t)$ where $n_1$, $n_2$ and t are integers, $(\alpha_1, \alpha_2)$ are spatial scaling parameters relatively to the input grid, which may be larger or smaller than 1 and $\tau_5(t)$ is a spatial shift. If the output grid is an interlaced grid then $\tau_5(t)=(0, 0, 0)$ if t is even and $\tau_s(t)=(0, 1,$ 0) if t is odd. If the output grid is a progressive grid then $\tau_5(t)=(0, 0, 0)$ for all t. In the following, we write $n=(n_1, n_2)$. For each output grid point $\hat{x}(n, t)$ the output video is specified by a value $\hat{v}(n, t)$. A scaling system is said to be a deinterlacing system if the input grid is interlaced and the output grid is progressive. It is said to be deinterlacing with unit scale if $\alpha_1=\alpha_2=1$. For example, for the 720 p HDTV standard, the integers $n_1$, $n_2$ are respectively in the range from 1 to 1280 and from 1 to 720. If the input video is a PAL standard, the parameters are $\alpha_1=576/720$ and $\alpha_2=720/1280$.

At each time t, the super-resolution scaling system takes in input an image v(n, t+d) and it outputs an image $\hat{v}(n, t)$ with a delay d that is typically between 1 and 5. A new grid $\tilde{G}$ is defined as the set of all points of the output grid $\hat{G}$ which do not belong to G. A new point is a point of the new grid.

The calculation of $\hat{v}(n, t)$ is performed with a maximum likelihood approach. A family of interpolators that is defined a priori provides a family of image values at each new point. A conditional probability distribution for the unknown new point values is estimated from the observed input image values in the neighborhood of each new point.

The apparatus includes a parameterized interpolation module (101) which takes in input the input video and apply a family of linear interpolators $\{E_\gamma\}_{\gamma \in \Gamma}$, indexed by a multiparameter $\gamma$ in a predefined parameter set $\Gamma$. The module (101) outputs at each new grid point $\hat{x}(n, t) \in \tilde{G}$ a family of interpolated values $\{\hat{v}_\gamma(n, t)\}_{\gamma \in \Gamma}$. A linear interpolator $E_\gamma$ computes $\hat{v}_\gamma(n, t)$ in $\hat{x}(n, t) \in \tilde{G}$ with a parameterized weighted averaging of the input image values v(n', t−s) for $|s| \leq d$:

$$\hat{v}_\gamma(n, t) = E_\gamma(x(n, t), v) \quad (1)$$

$$= \sum_{n'} \sum_{s=-d}^{d} K_\gamma(\hat{x}(n, t) - x(n', t-s)) v(n', t-s).$$

The two-dimensional interpolation kernel $K_\gamma(x)$ has a finite support so the sum (1) is evaluated on a finite number of terms where x(n', t−s)) is sufficiently close to $\hat{x}(n, t)$. Any state of the art interpolators may be used in the present invention. An exemplary embodiment of directional spatio-temporal interpolators is described later. The interpolations are implemented with separable one-dimensional linear interpolations along different directions. A one-dimensional linear interpolation at u from values f(p) can be calculated with an FIR linear filtering:

$$\hat{f}(u) = \sum_{p=-\Delta}^{\Delta} K(u-p)f(p)$$

where the interpolation kernel K has a support included in $[-\Delta, \Delta]$ and satisfies $\sum_{p=-\Delta}^{\Delta} K(u-p)=1$ for all $u \in [0, 1]$. Typically, $\Delta$ is between 1 and 8.

Insensitive Log-Likelihood

The choice of a best interpolation at each new point $\hat{x}(n, t)$ is advantageously performed by minimizing a negative log-likelihood calculated from the neighborhood input video values v(p, t). The conditional probability distribution of a new point image value knowing neighborhood input image values is estimated with an insensitive interval inside which this probability distribution is estimated to be maximum and constant because of a lack of data that can discriminate the-probability distribution value inside this interval. The distance between a point x and an interval I=[a, b] is written:

$$|x - I| = \begin{cases} a - x & \text{if } x < a \\ 0 & \text{if } x \in I \\ x - b & \text{if } x > b \end{cases}$$

An interval insensitive probability distribution $p_I(u)$ is defined for I=[a, b] and $\epsilon$=b−a by $$p_I(u) = \eta \begin{cases} 1 & \text{if } u \in I \\ f(|u - I|, \epsilon) & \text{if } u \notin I \end{cases} \quad (2)$$

where for any fixed $\epsilon$, f(0, $\epsilon$)=1 and f(u, $\epsilon$) is a monotonically decreasing function of u, and $\eta$ is adjusted so that $\int p_I(u)dx=1$. Any choice of f(u, $\epsilon$) is possible. Vapnik robust interval insensitive probability distribution is defined by $$p_I(u) = \frac{1}{2 + \epsilon} \begin{cases} 1 & \text{if } u \in I \\ \exp(-|u - I|) & \text{if } u \notin I \end{cases} \quad (3)$$

which corresponds to f($\epsilon$, u)=exp(−u). One may also choose f($\epsilon$, u)=exp(−u/$\epsilon$).

The apparatus has an insensitive interval estimation module (102) to compute for each new point $\hat{x}(n, t) \in \tilde{G}$ an insensitive interval I(n, t)=[a(n, t), b(n, t)] in which the output image value at $\hat{x}(n, t)$ is likely to be located but inside which there is no significant information to discriminate the probability of different values. The interval I(n, t) is calculated from input image values v(n', t') where x(n', t') is in a specified neighborhood N(n, t) of $\hat{x}(n, t)$. Let C(n, t) be the number of points in this neighborhood. In an exemplary embodiment, a neighborhood N(n, t) of $\hat{x}(n, t)$ is defined as a set of input grid points x(n', t') with |t−t'|≤d and where the spatial coordinates of x(n', t') are in a spatial square of width 2$\Delta$ centered in the spatial coordinates of $\hat{x}(n, t)$, where $\Delta$ is a predefined parameter. Typically, $\Delta$ is between 1 and 5.

In an exemplary embodiment, an insensitive interval is computed from the mean m(n, t) and the standard deviation $\sigma(n, t)$ of all points in the neighborhood $$m = (n, t) = \frac{1}{C(n, t)} \sum_{(n', t') \in N(n, t)} v(n', t'),$$

$$\sigma^2(n, t) = \frac{1}{C(n, t)} \sum_{(n', t') \in N(n, t)} (v(n', t') - m(n, t))^2.$$

The module (102) sets I(n, t)=[m(n, t)−$\beta\sigma$(n, t), m(n, t)+$\beta\sigma$(n, t)] where $\beta$ is a constant typically smaller than 3. In another embodiment, the module (102) estimates an insensitive interval from the ranked statistics of the points in N(n, t). We denote by $\{v_k\}_{1 \leq k \leq C(n,t)}$ the C(n, t) ranked values of N(n, t) with $v_k \geq v_{k+1}$. Let p be a positive integer with p<C(n, t)/2. If C(n, t) is even then $k_1$=C(n, t)/2−p+1 and $k_2$=C(n, t)/2+p and if C(n, t) is odd then $k_1$=(C(n, t)+1)/2−p and $k_2$=(C(n, t)+1)/2+p. A ranked statistics insensitive interval I(n, t)=[a(n, t), b(n, t)] is defined by a(n, t)=$v_{k_1}$ and b(n, t)=$v_{k_2}$. Typically, p is between 1 and 3.

In yet another exemplary embodiment, the insensitive interval estimation is implemented by partitioning N(n, t) into a plurality of disjoint subsets N(n, t)=$\cup_{i=1}^{k} N_i(n,t)$. An insensitive interval $I_i(n, t)$ is calculated from each $N_i(n, t)$ with any procedure such as a mean and standard-deviation procedure or a ranked statistics procedure. These insensitive intervals are then combined to form a single insensitive interval. In an exemplary embodiment, N(n, t) is separated into the set $N_1$(n, t) of all points x(n', t')$\in$N(n, t) for t'=t and the set $N_2$(n, t) of all points x(n', t')$\in$N(n, t) for t'$\neq$t. If the two insensitive intervals $I_1$(n, t) and $I_2$(n, t) have a non-empty intersection the final insensitive interval I(n, t) is defined as this intersection, otherwise the interval I(n, t) can be set as the union of the two intervals.

The apparatus further includes an insensitive loss calculation module (103) which outputs for each interpolator $E_\gamma$ and each new point $\hat{x}(n, t) \in \tilde{G}$ the negative log likelihood of $\hat{v}_\gamma(n, t)$ relatively to the interval insensitive probability distribution calculated for I(n, t)=[a(n, t), b(n, t)]. The goal is to minimize this loss so additive constants can be removed from the log-likelihood. As a result of (2), this loss becomes for $\epsilon$(n, t)=b(n, t)−a(n, t):

$$l_\gamma(n, t) = \begin{cases} 0 & \text{if } v_\gamma(n, t) \in I(n, t) \\ -\log f(|v_\gamma(n, t) - I(n, t)|, \epsilon(n, t)) & \text{otherwise} \end{cases}$$

For Vapnik robust interval insensitive probability distribution (3), this loss becomes $$l_\gamma(n, t) = \begin{cases} 0 & \text{if } v_\gamma(n, t) \in I(n, t) \\ |v_\gamma(n, t) - I(n, t)| & \text{otherwise} \end{cases}$$

A spatial regularization module (104) takes in input the insensitive loss $l_\gamma(n, t)$ calculated at each new point $\hat{x}(n, t) \in \tilde{G}$ and for each $\gamma \in \Gamma$ and performs a spatial low-pass filtering to compute a regularized loss over a spatial neighborhood $\tilde{N}_1$(n, t) by making a weighted sum over this neighborhood. In an exemplary embodiment, $\tilde{N}_1$(n, t) is a rectangle centered at $\hat{x}(n, t)$ which contains a fixed number $C_1$ of new grid point, and all weights are set to 1. The regularization is thus calculated as a sum over these $C_1$ points, typically between 16 and 256, $$\hat{l}_\gamma(n, t) = \sum_{\hat{x}(p,t) \in \tilde{N}_1(n,t)} l_\gamma(p, t). \quad (4)$$

Any state of the art fast algorithm can be used to evaluate this sum. In another exemplary embodiment this sum is replaced by a weighted sum where the sum of all weights in $\tilde{N}_1$(n, t) is equal to a constant that remains the same for all new points $\hat{x}(n, t) \in \tilde{G}$.

The apparatus shown in FIG. 1 has a minimum loss selection module (105) which takes in input $\hat{l}_\gamma(n, t)$ for each new point $\hat{x}(n, t) \in \tilde{G}$ and all $\gamma \in \Gamma$ and finds the parameter $\phi(n, t) \in \Gamma$ of the best interpolator which minimizes the loss $\hat{l}_\gamma(n, t)$ over all interpolators:

$$\hat{l}_{\phi(n,t)}(n, t) = \min_{\gamma \in \Gamma} \hat{l}_\gamma(n, t).$$

The loss selection module (105) outputs for each new point the minimum loss interpolation $\hat{v}_{\phi(n,t)}(n, t)$.

The input/new grids aggregation module (106) takes in input the minimum loss interpolation $\hat{v}_{\phi(n,t)}(n, t)$ at each new point $\hat{x}(n, t) \in \tilde{G}$ and the input video values $v(p, t)$ and it outputs a super-resolution video defined over the output grid $\hat{G}$. For each new point $\hat{x}(n, t) \in \tilde{G}$, the aggregation module (106) outputs the minimum loss interpolation $\hat{v}(n, t) = \hat{v}_{\phi(n,t)}(n, t)$. For each output point that is in the input grid $\hat{x}(n, t) = x(p, t) \in G$, the aggregation module (106) outputs the corresponding input video value $\hat{v}(n, t) = v(p, t)$.

While a detailed description of exemplary embodiments of FIG. 1 has been given above, various alternative, modifications, and equivalents will be apparent to those skilled in the art. For example, any state of the art optimization and ordering of the calculations, exploiting the spatial localization of the calculations in the modules (101), (102), (103), (104) and (105), to reduce the memory requirements, performs the same functions without varying from the spirit of the invention.

The apparatus described above process a single component of the video image. For multicomponents image, all components can be processed independently. Another possibility included in this invention is to process simultaneously all the components and define the insensitive loss of module (103) as a weighted sum of the insensitive loss obtained for each component, and thus choose the same best interpolator Et for all components at any given new grid point.

Total Variation Penalization

The method according to the invention can further comprise a penalization of the insensitive loss by a total variation increment. This penalization provides a control over the oscillations introduced by the selected best interpolation.

Figure 2:
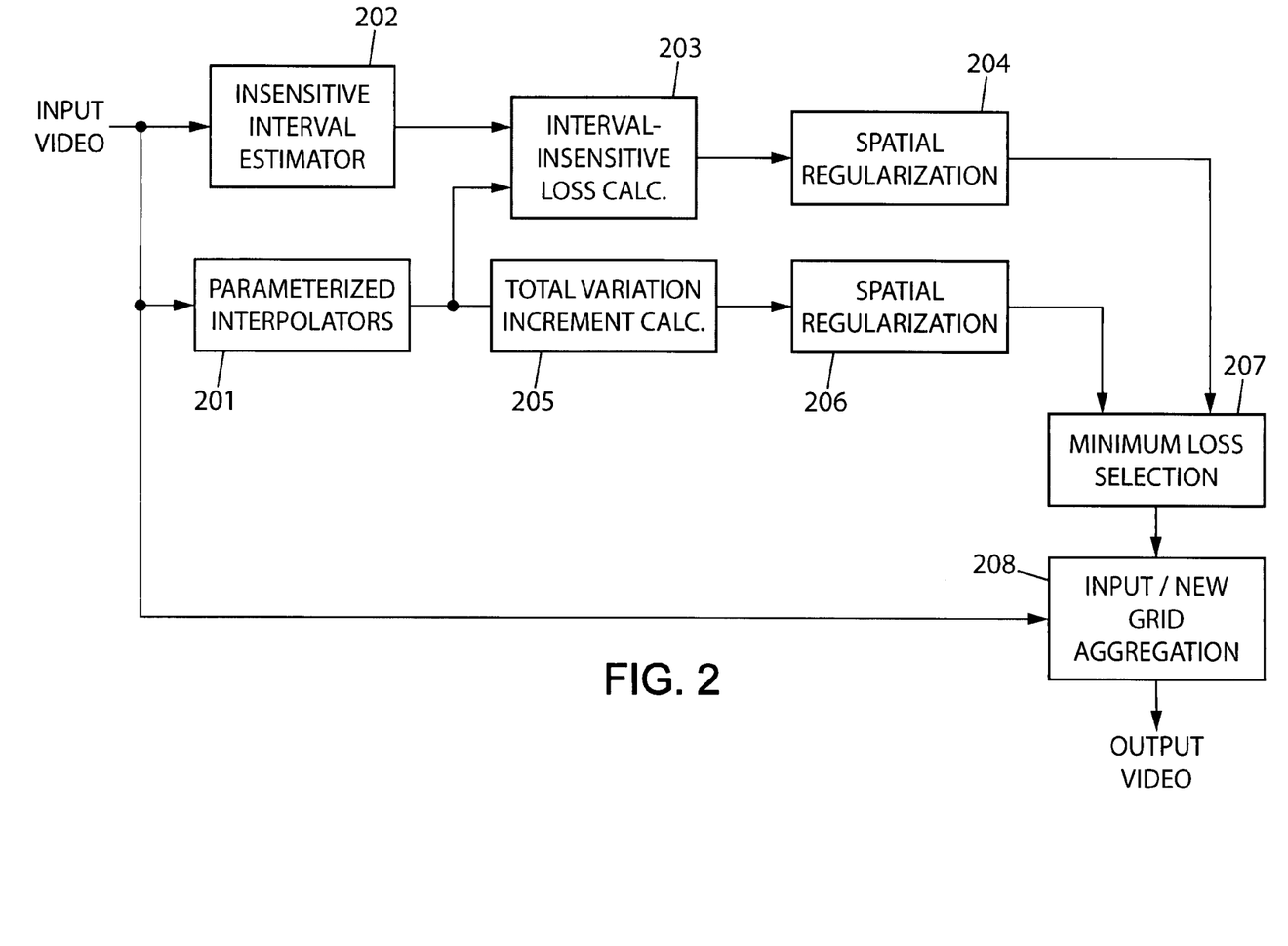
FIG. 2 shows, in block diagram form, an exemplary configuration of the invention which takes in input a video and computes an output video on a predefined output grid by minimizing an interval insensitive loss penalized by a regularized total variation increment.

FIG. 2 shows another apparatus according to the present invention. In this embodiment, the loss function used to select the parameterized interpolation is penalized by a total variation increment. The modules (201), (202), (203) and (204) in FIG. 2 are respectively identical to the modules (101), (102), (103) and (104) in FIG. 1. The module (208) in FIG. 2. is also identical to the module (106) in FIG. 1.

The apparatus illustrated in FIG. 2 comprises a total variation increment module (205) to compute for each interpolator $E_\gamma$ a total variation increment produced by inserting a grid of interpolated new point values in a grid of input video values, in a neighborhood of each new point $\hat{x}(n, t) \in \tilde{G}$. In a preferred embodiment, the neighborhood is chosen to be one-dimensional and either horizontal or vertical. For a deinterlacing system, this neighborhood is chosen to be vertical to control the vertical total image variation increment produced by the deinterlacing. An exemplary embodiment with a vertical one-dimensional neighborhood is described below. The same procedure applies for a horizontal neighborhood by exchanging the roles of image rows and columns.

Figure 4:
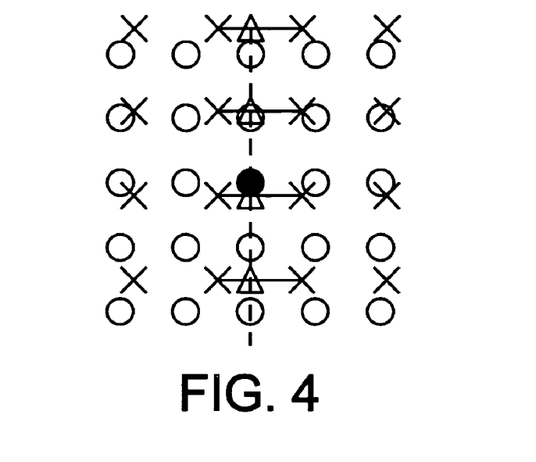
FIG. 4 is a schematic diagram illustrating input grid point and new point configurations for the calculation of total variation increments.
Figure 5:
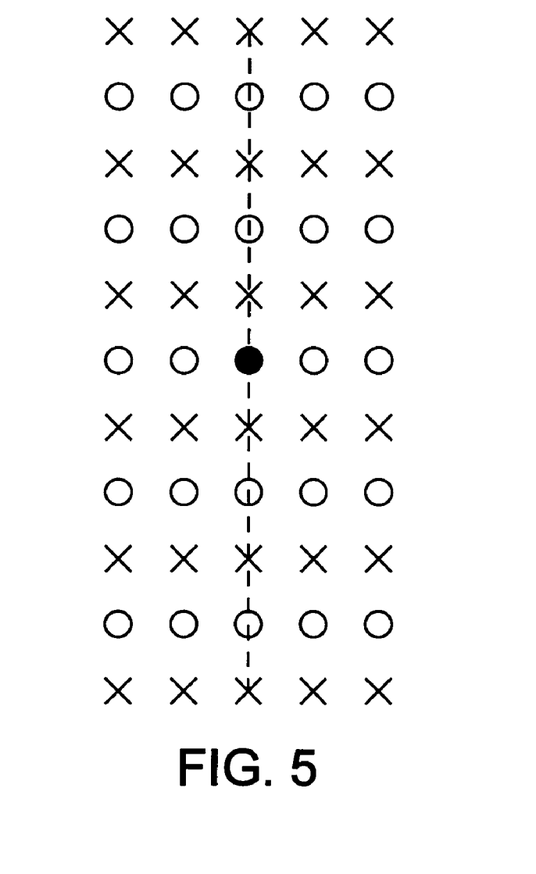
FIG. 5 is a schematic diagram illustrating input grid point and new point configurations for the calculation of total variation increments for a deinterlacing system.

A vertical one-dimensional neighborhood of $\hat{x}(n, t) \in \tilde{G}$ is a vertical segment of size L centered at $\hat{x}(n, t)$. The value of L is a parameter that is typically between 1 and 15. ¿From top to bottom, we denote by $\{\hat{h}_l\}_l$ the vertical coordinates of the new points of $\tilde{G}$ that are in the vertical neighborhood of $\hat{x}(n, t)$, and by $\{\hat{v}_l\}_l$ the corresponding interpolated values calculated with $E_\gamma$. FIG. 4 illustrates the position of input points $x(p, t)$ with crosses, the new point $\hat{x}(n, t)$ is shown as a black circle and other new points $\hat{x}(n', t)$ with white circles, and the one-dimensional vertical neighborhood with a vertical dashed segment. For each input image row that intersects this vertical segment, an input image value is calculated at the intersection location with a one-dimensional interpolation operation along the image row. ¿From top to bottom, we denote by $\{h_k\}_k$ the vertical coordinates of these intersections locations, and by $\{v_k\}_k$ the corresponding input image values. The position of these interpolated points are shown in FIG. 4 as triangles. If the input grid is an interlaced grid and the output grid is a progressive grid with scaling factors $\alpha_1 = \alpha_2 = 1$ then the new points are on the same columns as input points so the values $v_k$ correspond to input video values, as illustrated by FIG. 5.

For each new point in the vertical neighborhood of vertical coordinate $\hat{h}_l$, either there are two consecutive input image points of coordinates $h_k$ and $h_{k+1}$ such that $h_k > \hat{h}_l \geq h_{k+1}$ or this points corresponds to the bottom-most or top-most point in the vertical segment. If the first condition is satisfied, the total variation increment produced by the insertion of $\hat{v}_l$ between $v_k$ and $v_{k+1}$ is equal to the distance between $\hat{v}_l$ and the interval $I_k = [\min(v_k, v_{k+1}), \max(v_k, v_{k+1})]$, written $|\hat{v}_l - I_k|$. This distance is calculated for each new points in the vertical neighborhood located between two input image points values.

Conversely, for each input point in the vertical neighborhood of vertical coordinate $h_k$, either there are two consecutive new points of coordinates $\hat{h}_{l'}$ and $\hat{h}_{l'+1}$ such that $\hat{h}_{l'} > h_k \geq \hat{h}_{l'+1}$ or this points corresponds to the bottom-most or top-most point in the vertical segment. The total variation increment produced by the insertion of $v_k$ between $\hat{v}'_{l'-1}$ and $\hat{v}'_{l'}$ is equal to the distance between $v_k$ and the interval $\hat{I}_{l'} = [\min(\hat{v}_{l'}, \hat{v}_{l'-1}), \max(\hat{v}_{l'}, \hat{v}_{l'-1})]$, written $|v_k - \hat{I}_{l'}|$. This distance is calculated for each $v_k$ located between two new point image values $\hat{v}_{l'-1}$ and $\hat{v}'_{l'}$.

The resulting total variation increment measure of the estimator $E_\gamma$ in the vertical neighborhood of $\hat{x}(n, t)$ is written $w_\gamma(n, t)$. It is calculated by aggregating the total variation increments obtained for all input points $v_k$ located between two new point image values $\hat{v}_{l'-1}$ and $\hat{v}'_{l'}$ and all interpolated values $\hat{v}_l$ located between two input image points values $v_k$ and $v_{k+1}$ in this vertical neighborhood. In an exemplary embodiment, $w_\gamma(n, t)$ is a weighted average of all these total variation increments. In yet another exemplary embodiment it is obtained from a ranked statistics over all these total variations increments. The $w_\gamma(n, t)$ value is obtained as the p value in the ranked list of all total variations increments with p a fixed positive integer.

The spatial regularization module (206) shown in FIG. 2 takes in input the total variation $w_\gamma(n, t)$ calculated at each new point $\hat{x}(n, t) \in \tilde{G}$ for each parameterized interpolator $E_\gamma$ and performs spatial low-pass filtering to compute a regularized total variation increment with a weighted sum over a larger spatial neighborhood. In an exemplary embodiment, the module (206) computes a sum over a rectangular spatial neighborhood $\tilde{N}_2(n, t)$ of $\hat{x}(n, t)$ that contains a fixed number $C_2$, typically between 4 and 64, of new grid points:

$$\hat{w}_\gamma(n, t) = \sum_{\hat{x}(p,t) \in \tilde{N}_2(n,t)} w_\gamma(p, t). \tag{5}$$

In another exemplary embodiment this sum is replaced by a weighted sum where the sum of all weights in $\tilde{N}_2(n, t)$ is equal to a constant that remains the same for all new points $\hat{x}(n, t) \in \tilde{G}$.

The minimum loss selection module (207) takes in input for each new point $\hat{x}(n, t) \in \tilde{G}$ and for each interpolator $E_\gamma$ the regularized interval insensitive loss $\hat{l}_\gamma(n, t)$ and the regularized total variation $\hat{w}_\gamma(n, t)$ and computes a penalized loss $$\bar{l}_\gamma(n,t) = \hat{l}_\gamma(n,t) + \lambda \hat{w}_\gamma(n,t)$$

where $\lambda$ is a predefined penalization constant, typically between 1 and 10. The module (207) finds the parameter $\phi(n, t) \in \Gamma$ of the best interpolator which minimizes the penalized loss $\bar{l}_\gamma(n, t)$ over all interpolators:

$$\bar{l}_{\phi(n,t)}(n,\ t) = \min_{\gamma \in \Gamma} \bar{l}_\gamma(n,\ t),$$

and it outputs for each new point the minimum loss estimation $\hat{v}_{\phi(n,t)}(n, t)$.

The total variation penalization can be applied to a loss measure that is different from the interval insensitive loss described with reference to FIG. 1, in order to improve the choice of a best interpolator. It can thus be used in a different configuration than the present invention.

As in the apparatus described in FIG. 1, the apparatus described above processes a single component of the video image. For multicomponents image, all components can be processed independently. Another possibility included in this invention is to process simultaneously all the components and define the penalized loss of module (207) as a weighted sum of the penalized loss obtained for each component, and thus choose the same best interpolator E, for all components at any given new grid point.

Parameterized Directional Interpolations

Figure 3:
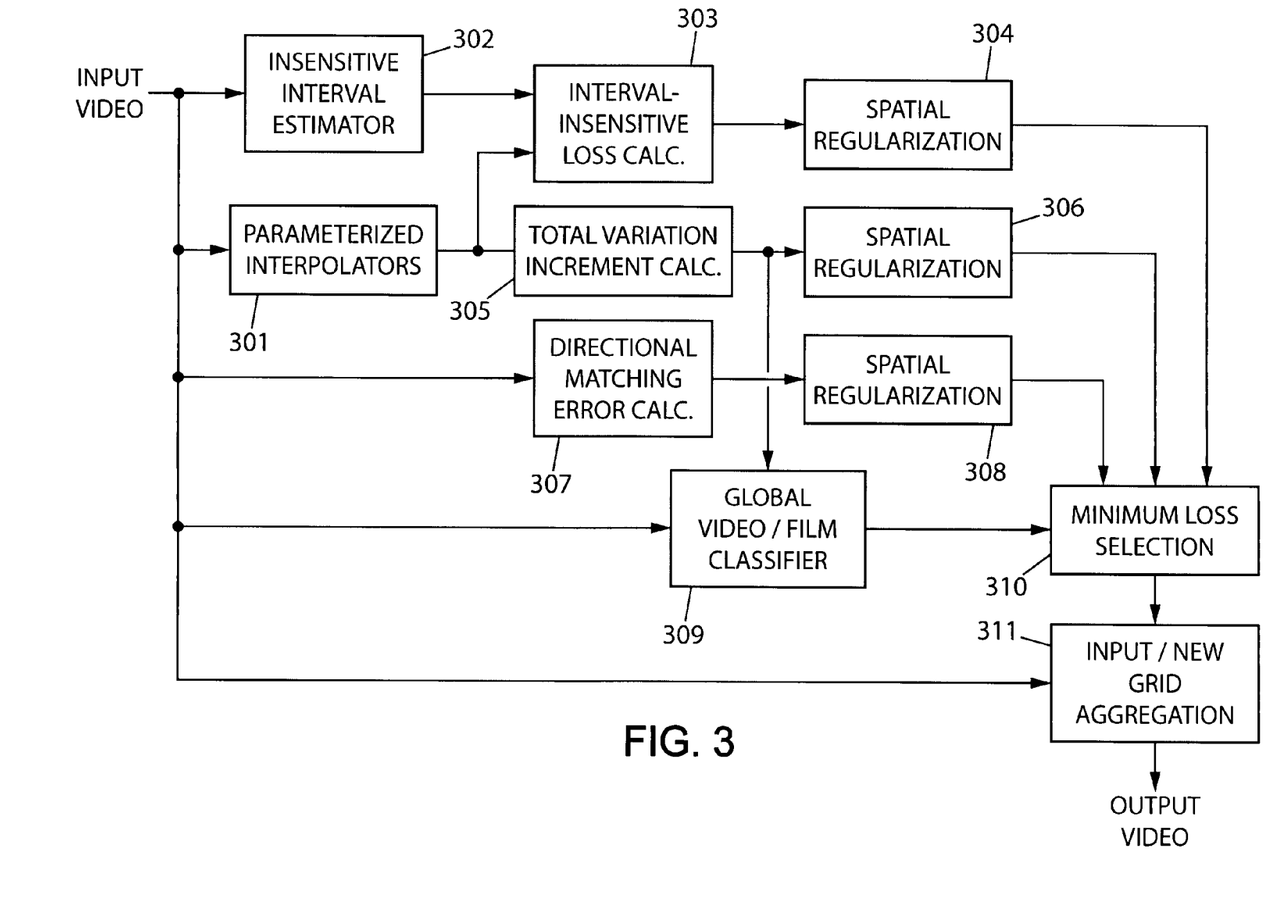
FIG. 3 shows, in block diagram form, an exemplary configuration of the invention which takes in input a video and computes an output video on a predefined output grid by minimizing an insensitive loss penalized by total variation increment and directional matching errors.

FIG. 3 shows another embodiment of an apparatus according to the present invention. The interpolations are performed along parameterized directions, and a directional matching loss gives a measure of the input image variations along these directions. The modules (302), (303), (304), (306) in FIG. 3 are respectively identical to the modules (202), (203), (204), (206) in FIG. 2 and the module (311) is identical to the module (208).

The parameterized directional interpolators module (301) takes in input the input video and computes at each new grid point $\hat{x}(n,\ t) \in \tilde{G}$ a family of interpolation values $\{\hat{v}_\gamma(n,\ t)\}_{\gamma \in \Gamma}$ obtained by applying a family of linear interpolators $\{E_\gamma\}_{\gamma \in \Gamma}$, indexed by a multiparameter γ, that includes a direction parameter. In a preferred embodiment, these parameterized directional interpolators are calculated with one-dimensional interpolations along the rows or columns of the input image and with directional interpolations along parameterized spatio-temporal directions. Any state of the art procedure may be used for the one-dimensional interpolations.

The directional matching error module (307) receives the input video and computes at each new grid point $\hat{x}(n,\ t) \in \tilde{G}$ a family of directional matching errors $\{e_\gamma(n,\ t)\}_{\gamma \in \Gamma}$ associated to the parameterized directional interpolators $\{E_\gamma\}_{\gamma \in \Gamma}$. In a preferred embodiment, these matching errors are calculated from differences between input image values along each parameterized direction. These directional matching errors quantify the input video variations in the spatio-temporal direction of each directional interpolator.

In a preferred implementation, interpolators are parameterized by a spatio-temporal direction that is specified by a spatial vector $w = w_1 \tau_1 + w_2 \tau_2 = (w_1,\ w_2,\ 0)$ and a time increment which specifies input images $v(p, t-s)$ and $v(p, t+s)$ from which the interpolated value at $\hat{x}(n,\ t)$ is calculated. These interpolators are thus specified by the multiparameter value $\gamma = (w_1, w_2, s)$ that is chosen among a predefined family of r of spatio-temporal parameters.

The maximum value of the time-shift s over Γ is the delay d of the super-resolution system. The images $x(n, t+s)$ up to s=d are needed to estimate the new point values $v_\gamma(n, t)$ and we must keep in memory the 2d+1 images $x(n, t')$ for $t-d \leq t' \leq t+d$ to perform these estimations.

If s=0 then $\hat{v}_\gamma(n,\ t)$ is calculated with a spatial interpolator from the input image $v(n', t)$. This spatial interpolation is performed with a separable interpolations along first a preferential orientation that is either horizontal or vertical, and then along the spatial direction $w=(w_1, w_2, 0)$. If the input video is interlaced, the preferential interpolation direction is chosen to be horizontal because the sampling distribution is twice larger along rows than columns. If the input video is progressive, the preferential interpolation direction can be chosen to be vertical if the angle of $(w_1, w_2)$ with the horizontal $(1, 0)$ is smaller than π/4 in which case we normalize $w_1=1$, and the preferential interpolation direction is horizontal if the angle of $(w_1, w_2)$ with the horizontal is bigger than π/4, in which case we normalize $w_2=1$.

Suppose that the preferential interpolation direction is horizontal at $\hat{x}(n, t)$ and hence that $w=(w_1, 1)$. If $\hat{x}(n, t)$ is located on a row of the input grid, then $v_\gamma(n, t)$ can be calculated with a one-dimensional linear interpolation along this row at $\hat{x}(n, t)$. If $\hat{x}(n, t)$ is not located on a row of the input grid then its position can be written $\hat{x}(n, t) = x_1 \tau_1 + \alpha x_2 \tau_2 + \tau_4(t) + t\tau_3$, and let $n_2$ be the unique integer such that $n_2 < x_2 < n_2+1$. Let $y=\hat{x}(n, t)+\alpha(n_2+1-x_2)w$ and $z=\hat{x}(n, t)-\alpha(x_2-n_2)w$ be the projection of $\hat{x}(n, t)$ in the direction of w, on the input image row just above and just below. The image values $v_y$ at y is obtained by interpolating the input image value along the row $v(n', t)$ for $n'=(p, n_2)$ with a one-dimensional interpolation along the variable p, and the image value $v_z$ at z is obtained by with a one-dimensional interpolation of the input image values along the row $v(n', t)$ for $n'=(p, n_2+1)$. In an exemplary embodiment, the image interpolation at $\hat{x}(n, t)$ is defined with a first order linear interpolation between $v_y$ and $v_z$:

$$\hat{v}_\gamma(n,t) = (n_2+1-x_2)v_y + (x_2-n_2)v_z. \quad (6)$$

Figure 6:
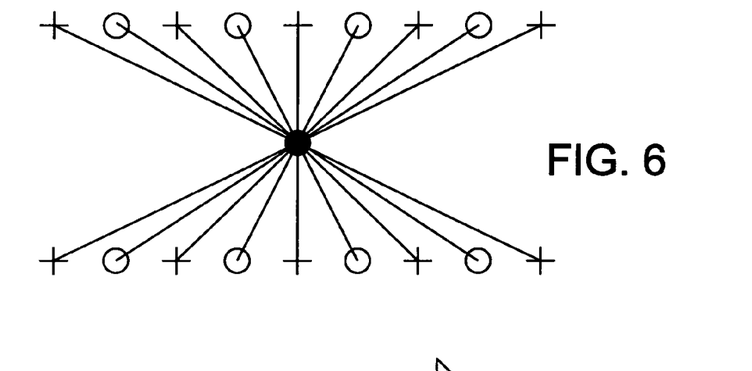
FIG. 6 is a schematic diagram illustrating input grid points used for spatial directional interpolations at a new point.

The directional matching error calculated by the module (307) for the interpolator $E_\gamma$ at $\hat{x}(n, t)$ is the directional variation in the direction of w, between $v_y$ and $v_z$:

$$e_\gamma(n,t) = |v_y - v_z|^\eta \quad (7)$$

where η>0 is a fixed exponent that is chosen a priori, typically equal to 1 or 2. In the particular case of a deinterlacing with unit scale then $x_2=n_2+\frac{1}{2}$ and hence $\hat{v}_\gamma(n, t) = (v_y+v_z)/2$. This case is illustrated in FIG. 6.

When the preferential interpolation direction is vertical rather than horizontal, $w=(1, w_2)$ and the same computations apply for the interpolators, by exchanging the roles of the horizontal and vertical coordinate axes, as well as of the input image rows and columns and by replacing α by 1.

If s>0, the spatio-temporal projection of $\hat{x}(n, t)$ in the images at t−s and t+s are located at $y=\hat{x}(n, t)-w-s\tau_3$ and $z=\hat{x}(n, t)+w+s\tau_3$. The image value $v_y$ at the position y is calculated with a separable interpolations along the rows and columns of the input image values $v(n', t-s)$ at the grid points $x(n', t-s)$. Similarly the image value $v_z$ at the position z is calculated with separable interpolations along the rows and columns of the input image values $v(n', t+s)$ at the grid points $x(n', t-s)$. The estimated image value at $\hat{x}(n, t)$ is $\hat{v}_{65}(n, t) = (v_y+v_z)/2$ and the directional matching error is $e_\gamma(n, t) = |v_y-v_z|^\eta$.

In a preferred embodiment, the set of all possible directions w are chosen so that for each new point $\hat{x}(n, t)$ the projected positions y and z at t−s and t+s are located on a uniform grid that is precalculated by oversampling the input images $v(n', t-s)$ and $v(n', t+s)$ by fixed factors along their rows and columns.

Figure 7:
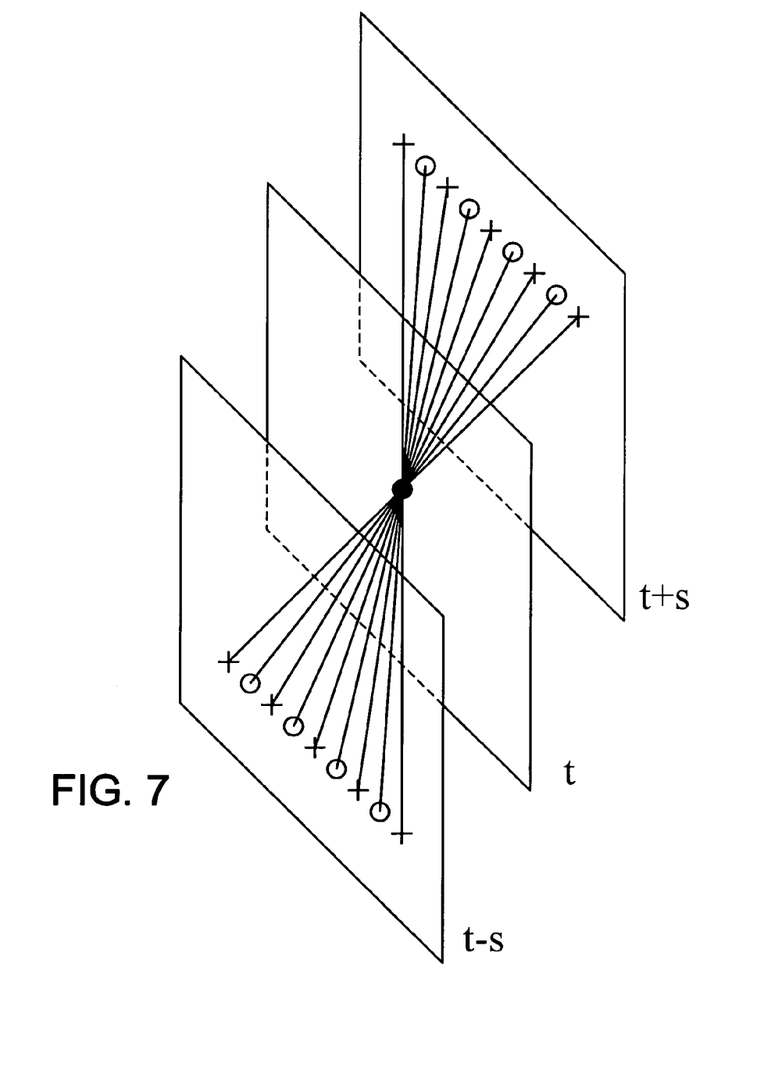
FIG. 7 is a schematic diagram illustrating input grid points used for spatio-temporal directional interpolations at a new point.

For a deinterlacing system, the preferential spatial interpolation direction is horizontal. In an exemplary embodiment, with unit scale, for s=0 the family of spatial direction vectors w is $\{(k/q, 1, 0)\}_{-K \leq k \leq K}$ where q is a fixed integer. FIG. 6 shows the oversampling needed to perform these spatial interpolations, with a typical choice of q=2 and K=4. The crosses indicated input image points $x(p, t)$, the white circles are intermediate interpolated points and the black circle is a new point from which are shown 9 different directions. The family of spatio-temporal direction vectors depend upon the parity of the time-shift. If s is odd, then the family of spatio-temporal direction vectors is $\{w=(k/q, 2l, 0)\}_{-K_l \leq k \leq K_l, -L \leq l \leq L}$ and if s>0 is even then the family of spatio-temporal direction vectors is $\{w=(k/q, 2l+1, 0)\}_{-K_l \leq k \leq K_l, -L \leq l < L}$ where the $K_l$ may depend upon l or be chosen to be constant with a value typically between 2 and 8. The value of q is typically between 1 and 8 and L between 1 and 5. For such family of directions, all projected positions y and z are along a uniform grid obtained by oversampling the input image rows v(n', t−s) and v(n', t+s) by the factor q. FIG. 7 illustrates spatio-temporal interpolations directions corresponding to an oversampling factor q=2. The crosses indicated input image points x(p, t), the white circles are intermediate interpolated points and the black circle is a new point $\hat{x}$(n, t).

The spatial regularization module (308) shown in FIG. 3 takes in input the directional matching error $e_\gamma$(n, t) calculated at each new point $\hat{x}(n, t) \in \tilde{G}$ for each parameterized interpolator $E_\gamma$ and performs spatial low-pass filtering to compute a regularized directional matching error with a weighted sum over a larger spatial neighborhood. In an exemplary embodiment, the module (308) computes a sum over a rectangular spatial neighborhood $\tilde{N}_3$(n, t) of $\hat{x}$(n, t) that contains a fixed number $C_3$ of new grid points, typically between 16 and 256:

$$\hat{e}_\gamma(n, t) = \sum_{\hat{x}(p,t) \in \tilde{N}_3(n,t)} e_\gamma(p, t).$$

In another exemplary embodiment this sum is replaced by a weighted sum where the sum of all weights in $\tilde{N}3$ (n, t) is equal to a constant that remains the same for all new points $\hat{x}(n, t) \in \tilde{G}$.

For a deinterlacing system with unit scale, to incorporate the case of deinterlacing input videos that are in a telecined film format, two simple interpolators that perform a copy from a previous and a next image are incorporated. We write $E_{\gamma_p}$ the interpolator that copies from the previous image, and $E_{\gamma_p}$ sets $v_{\gamma_p}$(n, t)=v(n', t−1) where x(n', t−1) has the same spatial position as $\hat{x}$(n, t). We write $E_{\gamma_n}$ the interpolator that copies from the next image, and $E_{\gamma_n}$ sets $v_{\gamma_n}$(n, t)=v(n', t+1) where x(n', t+1) has the same spatial position as $\hat{x}$(n, t).

For a deinterlacing system, the scaling system can include a global video/film classifier (309) which outputs for each input image v(n, t) an image class c(t), which specifies if the image belongs to an "Interlaced Video Type" sequence or a "Telecined Film Type" sequence. The "Interlaced Video Type" category indicates that the image is a field of an interlaced video. The "Telecined Film Type" category indicates that the input image is a telecined film field. Each of these classes are refined by specifying if the image v(n, t) is mostly similar to the "Previous" input image or to the "Next" input image. The four classes are thus "Telecined Film Type, Next", "Telecined Film Type, Previous", "Interlaced Video, Next" and "Interlaced Video, Previous".

In a first embodiment, the global video/film classifier (309) has a user interface that allows a user to specify if the image is an "Interlaced Video Type" image or a "Telecined film Type" image. In an automatic embodiment of the module (309), the classification is performed with global total variation increment measures. For each new point $\hat{x}$(n, t) the total variation increment module (305) outputs the total variation increment $w_\gamma$(n, t) corresponding to each interpolator $E_\gamma$ and in particular for $\gamma = \gamma_p$ and $\gamma = \gamma_n$, which correspond to copy from previous and next images The module (309) takes in input these total variation increments $E_{\gamma_p}$(n, t) and $w_{\gamma_n}$(n, t) and computes global total variation increments over the whole new grid:

$$W_{\gamma_p}(t) = \sum_{\substack{n \\ \hat{x}(n,t) \in \tilde{g}}} w_{\gamma_p}(n, t),$$

$$W_{\gamma_n}(t) = \sum_{\substack{n \\ \hat{x}(n,t) \in \tilde{g}}} w_{\gamma_n}(n, t), \text{ and}$$

$$W_{\gamma_n, \gamma_p}(t) = \sum_{\substack{n \\ \hat{x}(n,t) \in \tilde{g}}} \min(w_{\gamma_n}(n, t), w_{\gamma_p}(n, t)).$$

$$\begin{cases} \min(W_{\gamma_n}(t), W_{\gamma_p}(t)) \leq \eta_1 W_{\gamma_n, \gamma_p}(t) \\ \text{and } \min(W_{\gamma_n}(t), W_{\gamma_p}(t)) \leq \max(W_{\gamma_n}(t), W_{\gamma_p}(t))/\eta_2 \end{cases}$$

with $\eta_1>1$ typically smaller than 10 and with $\eta_2>1$ typically smaller than 10, then the image class c(t) is set to be a "Telecined Type" image. Otherwise, for a threshold T, that is set a priori typically between 1 and 50 for 1 byte images, if $$\sum_{\substack{n \\ \hat{x}(n,t) \in \tilde{g}}} |v(n, t-1) - v(n, t+1)| < T \sum_{\substack{n \\ \hat{x}(n,t) \in \tilde{g}}} 1$$

then c(t) is also set to be "Telecined Film Type". Otherwise c(t) is set to be an "Interlaced Video Type" image. In either cases, if $W_{\gamma_n(t)} < W_{E_{\gamma_p(t)}}$ then the sub-class is "Next" indicating that the image is more similar to the next one and otherwise the sub-class is "Previous".

The minimum loss selection module (310) takes in input for each new point $\hat{x}(n, t) \in \tilde{G}$ and for each interpolator $E_\gamma$ the regularized interval insensitive loss $\hat{l}_\gamma$(n, t), the regularized total variation increment $\hat{w}_\gamma$(n, t) and the regularized directional matching error $\hat{e}_\gamma$(n, t). It computes a penalized loss and given the image class c(t) it performs a conditional minimization that finds the parameter φ(n, t) of the best interpolator. The module (310) outputs for each new point the minimum loss estimation $\hat{v}_{\phi(n,t)}$(n, t).

If the scaling system is not a deinterlacing system with unit scale, then for each new point $\hat{x}$(n, t) the regularized insensitive loss is penalized by the input total variation increment and the directional matching error:

$$\bar{l}_\gamma(n,t) = \hat{l}_\gamma(n,t) + \lambda \hat{w}_\gamma(n,t) + \mu \hat{e}_\gamma(n,t),$$

where λ and μ are two penalization constants. Typical choices for λ and μ is between 1 and 10. The minimum loss selection module (310) finds the parameters $\xi$ which minimizes this penalized loss excluding the two copy interpolators:

$$\bar{l}_\xi(n, t) = \min_{\substack{\gamma \in \Gamma \\ \gamma \neq \gamma_p, \gamma \neq \gamma_n}} \bar{l}_\gamma(n, t) \quad (9)$$

and it sets φ(n, t)=$\xi$.

If the scaling system is a deinterlacing system with unit scale, then the best interpolator choice depends upon the output of the global video/film classifier (309). If the image class c(t) is "Telecined Film Type, Next" then it sets φ(n, t)=$\gamma_n$ an which corresponds to a copy from the next image. If the image class c(t) is "Telecined Film Type, Previous" then φ(n, t)=γ$_p$ which corresponds to a copy from the previous image. If the image class is "Interlaced Video Type" then the minimum loss interpolator index ξ is calculated as in (9). If the image class c(t) is "Interlaced Video Type, Next" then this best interpolator is compared with a copy from the next image interpolator for locally telecined sequence. If $$\hat{l}_\xi(n,t)+\lambda'\hat{w}_\xi(n,t)<\hat{l}_{\gamma_n}(n,t)+\lambda'\hat{w}_{\gamma_n}(n,t)$$

where λ' is a penalization constant then φ(n, t)=ξ, otherwise φ(n, t)=γ$_n$. A typical choice for λ' is between 1 and 10. In a similar way, if the image class c(t) is "Interlaced Video Type, Previous" then if $$\hat{l}_\xi(n,t)+\lambda'\hat{w}_\xi(n,t)<\hat{l}_{\gamma_p}(n,t)+\lambda'\hat{w}_{\gamma_p}(n,t)$$

where λ' is a penalization constant then φ(n, t)=ξ and otherwise φ(n, t)=γ$_p$.

As in the apparatus described in FIG. 1 and FIG. 2, the apparatus described above processes a single component of the video image.

For multicomponents image, all components can be processed independently. Another possibility included in this invention is to process simultaneously all the components and define the penalized loss of module (310) as a weighted sum of the penalized loss obtained for each component, and thus choose the same best interpolator E$_γ$ for all components at any given new grid point.

The present invention may be embodied as software run by general-purpose micro-processor or digital signal processor, in which case the modules described above with reference to FIG. 1-3 are understood to be or form part of software modules or routines. It may also be implemented as a hardware component, for example in an ASIC or an FPGA, in which case the above-mentioned modules can form regions of the solid-state component. These embodiments of the present invention can be incorporated in various units such as a set-top box or a high definition television set that receives an interlaced SDTV video and outputs or displays an HDTV video. The present invention can also be incorporated in up/cross/down converters to modify the format of an input video and output any prescribed video format.

While a detailed description of exemplary embodiments of the invention has been given above, various alternative, modifications, and equivalents will be apparent to those skilled in the art. For example, while different components of the parameterized interpolator module or the minimum loss selection modules of the present invention are described herein as performing certain specific functions, one skilled in the art will appreciate that other components or circuits in the service module may perform some or all of such functions without varying from the spirit of the invention. Therefore the above description should not be taken as limiting the scope of the invention which is defined by the appended claims.

The invention claimed is:

1. A digital video scaling method for processing an input video signal having respective input image values at points of a space-time input grid to deliver an output video signal having respective output image values at points of a space-time output grid including points of said input grid and new points, the method comprising the following steps for each of said new points:
    (a) applying a predefined family of parameterized linear interpolators to the input image values in a respective space-time neighborhood of said new point to provide an interpolated value at said new point for each interpolator of said family;
    (b) estimating an interval of values associated with said new point from the input image values in a space-time neighborhood of said new point, such that a probability distribution of the output image value at said new point is estimated to have a global maximum within said interval of values;
    (c) computing a loss value for each interpolated value at said new point, based on a second probability distribution which is constant and maximum within the interval of values associated with said new point;
    (d) filtering spatially the loss value computed in respect of each interpolator of said family, in a spatial neighborhood of said new point; and
    (e) selecting an interpolator of said family which fulfills a minimization criterion depending on the filtered loss value, wherein the interpolated value for the selected interpolator is taken as the output image value at said new point.

2. A scaling method according to claim 1, wherein the loss value computed for an interpolated value at a new point is representative of a negative log-likelihood of said interpolated value relatively to the second probability distribution.

3. A scaling method according to claim 1, wherein the step of estimating the interval of values for a new point comprises:
    (a) dividing the space-time neighborhood used to estimate said interval of values into a plurality of sub-neighborhoods;
    (b) sorting the input image values in each of said sub-neighborhoods;
    (c) for each of said sub-neighborhoods, estimating a partial interval from two values of specified ranks among the sorted input image values; and
    (d) combining the plurality of partial intervals to form the interval of values associated with said new point.

4. A scaling method according to claim 1, wherein said second probability distribution has an exponential decay outside said interval of values.

5. A scaling method according to claim 1, further comprising the following steps for each of said new points and each interpolator of said family:
    (a) computing a total variation increment resulting from an aggregation of input image values and interpolated values calculated with said interpolator in a one-dimensional spatial neighborhood of said new point; and
    (b) filtering spatially said total variation increment in a spatial neighborhood of said new point,
and wherein the minimization criterion for selecting an interpolator of said family for a new point further depends on the filtered total variation increment.

6. A scaling method according to claim 5, wherein said one-dimensional spatial neighborhood is a vertical or horizontal spatial neighborhood.

7. A scaling method according to claim 5, wherein the minimization criterion for selecting an interpolator of said family for a new point comprises a weighted sum of the filtered loss value and of the filtered total variation increment.

8. A scaling method according to claim 1, wherein the interpolators of said family comprise parameterized directional interpolators to compute linear interpolations along respective parameterized spatio-temporal directions of the input grid.

9. A scaling method according to claim 8, further comprising the following steps for each of said new points and each directional interpolator of said family:
    (a) computing a directional matching error from a difference of interpolated input image values aligned with said new point along the spatio-temporal direction corresponding to said interpolator; and (b) filtering spatially said directional matching error in a spatial neighborhood of said new point, and wherein the minimization criterion for selecting an interpolator of said family for a new point further depends on the filtered directional matching error.

10. A scaling method according to claim 9, wherein the minimization criterion for selecting an interpolator of said family for a new point comprises a weighted sum of the filtered loss value and of the filtered directional matching error.

11. A scaling method according to claim 9, further comprising the following steps for each of said new points and each interpolator of said family:

(a) computing a total variation increment resulting from an aggregation of input image values and interpolated values calculated with said interpolator in a one-dimensional spatial neighborhood of said new point; and (b) filtering spatially said total variation increment in a spatial neighborhood of said new point, and wherein the minimization criterion for selecting an interpolator of said family for a new point further depends on the filtered total variation increment.

12. A scaling method according to claim 11, wherein the minimization criterion for selecting an interpolator of said family for a new point comprises a weighted sum of the filtered loss value, of the filtered directional matching error, and of the filtered total variation increment.

13. A scaling method according to claim 1, wherein the input video signal is interlaced and the output video signal is progressive.

14. A scaling method according to claim 13, further comprising the steps of:

(a) classifying each image of the input video signal as "Interlaced Video Type" or "Telecined Type";

(b) determining whether said image is more similar to a previous image of the input video signal than to a next image of the input video signal;

wherein values of new points between consecutive images classified as "Telecined Type" are synthesized by copying from the next or previous image at said new point location while values of new points of images classified as "Interlaced Video Type" are synthesized by means of the selected interpolators of said family.

15. A television system for displaying images on a television display, comprising a receiver for receiving an input video signal having respective input image values at points of a space-time input grid, a processor for applying digital video scaling to the input video signal to deliver an output video signal having respective output image values at points of a space-time output grid including points of said input grid and new points, and a display for displaying said output video signal, wherein the digital video scaling comprises, for each of said new points:

(a) applying a predefined family of parameterized linear interpolators to the input image values in a respective space-time neighborhood of said new point to provide an interpolated value at said new point for each interpolator of said family;

(b) estimating an interval of values associated with said new point from the input image values in a space-time neighborhood of said new point, such that a probability distribution of the output image value at said new point is estimated to have a global maximum within said interval of values;

(c) computing a loss value for each interpolated value at said new point, based on a second probability distribution which is constant and maximum within the interval of values associated with said new point;

(d) filtering spatially the loss value computed in respect of each interpolator of said family, in a spatial neighborhood of said new point; and (e) selecting an interpolator of said family which fulfills a minimization criterion depending on the filtered loss value, wherein the interpolated value for the selected interpolator is taken as the output image value at said new point.

16. A video scaling apparatus for processing an input video signal having respective input image values at points of a space-time input grid to deliver an output video signal having respective output image values at points of a space-time output grid including points of said input grid and new points, the apparatus comprising a computer system arranged to carry out the following steps for each of said new points:

(a) applying a predefined family of parameterized linear interpolators to the input image values in a respective space-time neighborhood of said new point to provide an interpolated value at said new point for each interpolator of said family;

(b) estimating an interval of values associated with said new point from the input image values in a space-time neighborhood of said new point such that a probability distribution of the output image value at said new point is estimated to have a global maximum within said interval of values;

(c) computing a loss value for each interpolated value at said new point, based on a second probability distribution which is constant and maximum within the interval of values associated with said new point;

(d) filtering spatially the loss value computed in respect of each interpolator of said family, in a spatial neighborhood of said new point; and (e) selecting an interpolator of said family which fulfills a minimization criterion depending on the filtered loss value, wherein the interpolated value for the selected interpolator is taken as the output image value at said new point.

17. A non-transitory computer readable medium, comprising instructions to carry out a digital video when said medium is run in a computer processing unit, wherein the digital video scaling receives an input video signal having respective input image values at points of a space-time input grid and delivers an output video signal having respective output image values at points of a space-time output grid including points of said input grid and new points, the digital video scaling comprising, for each of said new points:

(a) applying a predefined family of parameterized linear interpolators to the input image values in a respective space-time neighborhood of said new point to provide an interpolated value at said new point for each interpolator of said family;

(b) estimating an interval of values associated with said new point from the input image values in a space-time neighborhood of said new point, such that a probability distribution of the output image value at said new point is estimated to have a global maximum within said interval of values;

(c) computing a loss value for each interpolated value at said new point, based on a second probability distribution which is constant and maximum within the interval of values associated with said new point;

(d) filtering spatially the loss value computed in respect of each interpolator of said family, in a spatial neighborhood of said new point; and
(e) selecting an interpolator of said family which fulfills a minimization criterion depending on the filtered loss value, wherein the interpolated value for the selected interpolator is taken as the output image value at said new point.

* * * * *